United States Patent [19]

Rayner et al.

[11] 4,041,527

[45] Aug. 9, 1977

[54] VIDEO EFFECTS GENERATOR

[75] Inventors: Bruce Leland Rayner; Gerald Graham Taylor, both of Nevada City, Calif.

[73] Assignee: The Grass Valley Group, Inc., Grass Valley, Calif.

[21] Appl. No.: 667,242

[22] Filed: Mar. 15, 1976

[51] Int. Cl.² ............................................. H04N 9/00
[52] U.S. Cl. ................................................... 358/22
[58] Field of Search ..................... 178/DIG. 6; 358/22

[56] References Cited

U.S. PATENT DOCUMENTS 3,749,822  7/1973  VanderVeer et al. ................. 358/22

Primary Examiner—Robert L. Richardson

Attorney, Agent, or Firm—Kenneth M. Durk

[57] ABSTRACT

A special effects generator for use in video switching whereby a three dimensional shadow effect is produced by utilizing luminance information separately derived from RGB color inputs and providing a separate multiplier to control the shadow density. The generator functions by controllably blanking a portion of one video signal and then replacing such portion by another video signal and switching the displayed video linearly, said switching being controlled by color differences in one of the video signals, and providing luminance information derived from one video signal as a control signal for application to the other video signal so as to reduce the level thereof.

11 Claims, 6 Drawing Figures

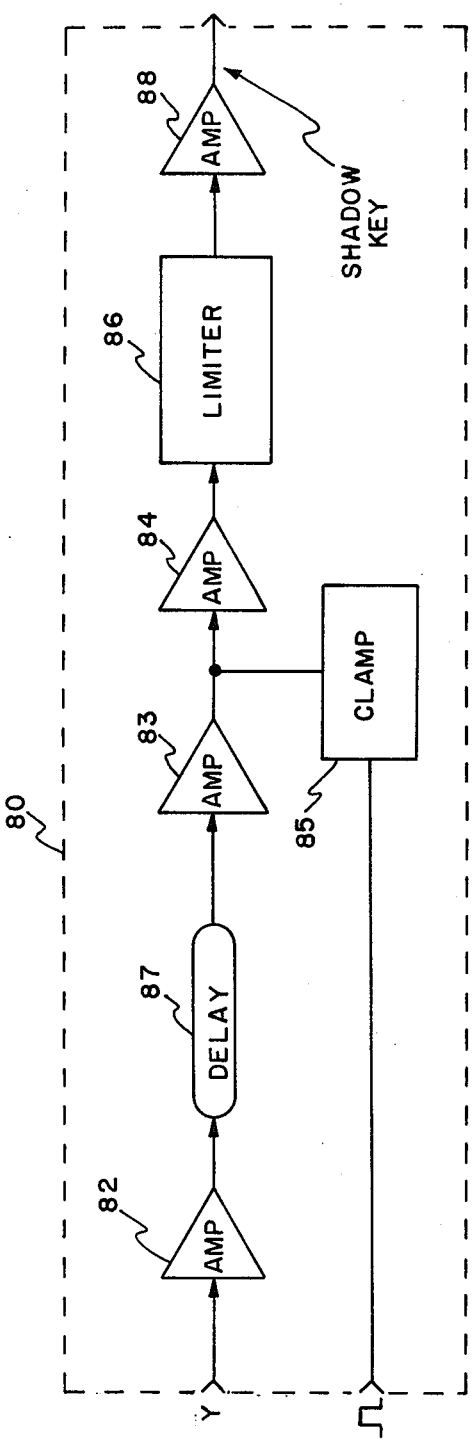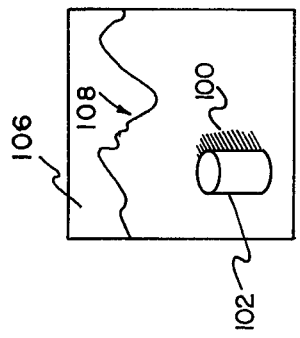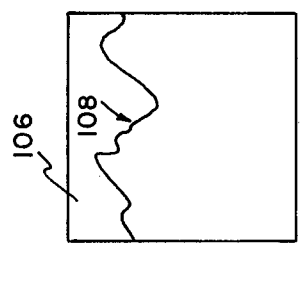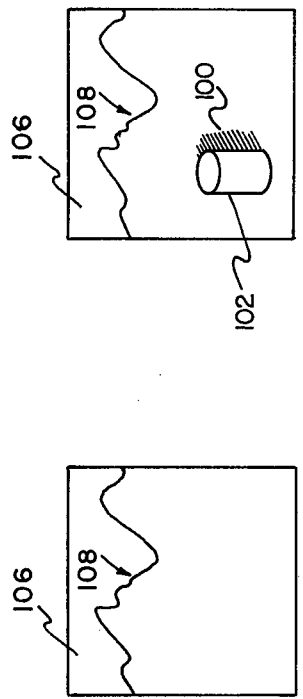

VIDEO EFFECTS GENERATOR

BACKGROUND OF INVENTION

The present invention relates generally to special effects generators for television signals, and more particularly to an electrical mechanism for generating a shadow for a color television chroma key effect.

In the development of television signals for transmission to devices such as receivers, it is often desired to combine signals from two or more independent sources. At the present time, a wide variety of special effects generators are being used by, say, commercial telecasters to select the available signal inputs in a variety of ways. For example, manual fading and lap dissolve between signal sources wherein an operator having control of the gain of the channels feeding into a mixer unit may switch rapidly from one channel to another or gradually fade one out and the other in, either allowing the signals to blend or be faded at any desired rate. Another method of changing from one channel to another is the well known wipe which allows the simultaneous presentation of two pictures, an example of which is the case in which a variable width blanking gate is used to wipe out all or part of the signal in the channel and replaced by a signal from another channel, the opposite part of which is blanked out. Other special effects generators can be used to combine signals from different channels to produce artistic effects, time share signals, etc. Such special effects generators are the so called keyed insertions whereby an arbitrary portion of one channel signal is blanked out and may or may not be replaced by signals from another channel depending on the effect desired. As an example of prior art methods and processes to produce these artistic effects including shadows, those interested are referred to U.S. Pat. No. 3,788,542 by L. C. Hanseman. This patent, which is an improvement of the basic work in the art, elaborates on a chroma key process called Technimatte for combining RGB components of the signals to be mixed to provide a chroma key produced by a proportional use of the amount of color information in one of the signals to be mixed. Other prior art processes such as Imagematt and Chromatech, developed by Image Transform Inc., and Technicolor, Inc. respectively, provide similar processes and methods. These processes can only produce shadows using color difference information. Therefore, none of these conventional special effects generators produces or is capable of producing a true shadow that is developed from luminance information. Shadows and variations in light intensity on, say, a real background that gives the real scene depth are lost in a standard chroma key effect whereas the present invention shadow key process and method retrieves these shadows and light intensity variations from the original scene and impresses them on the new background providing a three-dimensional effect that greatly improves the appearance of a linear chroma key.

SUMMARY OF INVENTION

As already stated, the present invention is directed to a special effects generator for generating a shadow key with a chroma key for a color television signal, which, when utilized in a video switching environment produces a three-dimensional shadow effect. In accordance with the principles of the present invention, whereby the shadow key is produced by utilizing luminance information derived from RGB color inputs and providing a separate multiplier to control the shadow density, the above-noted disadvantages of the prior art are avoided.

In a particular video switching system employing the invention, separate primary color signals i.e., RGB signals, are coupled to be resistively encoded into three different but related quantities: luminance signal Y corresponding to the brightness and whiteness of the RGB signals and two color difference signals $R-Y$, $B-Y$ describing how the brightness is to be distributed, say, on the phosphors of a color receiver. These color difference signals $R-Y$, $B-Y$ are then coupled to a means under the control of an operator to generate the conventional chroma key signal. The luminance signal Y is coupled to another means under the control of an operator to generate the shadow signal, which, contains the intensities required to provide depth, realism, and lifelike shadows in the output of the system. The chroma key signal and shadow key signal are then coupled to a conventional processing amplifier which also responds to signals from the remainder of the effects system to generate standard mixes or wipes. Under the control of the operator, both the chroma key signal and the shadow key signal are utilized by the processing amplifier to control the amplitude of control signals applied to a conventional mixer wherein mixing of two input video signals applied thereto is utilized to provide a composite thereof including shadows.

Thus, it is a primary object of the present invention to provide a novel apparatus for generating three-dimensional shadow effects when combining signals from a plurality of independent video sources.

It is a further object of the present invention to provide a novel video signal mixing system permitting achievement of three-dimensional shadow effects without producing certain undesired accompanying visual effects that characterized the achievement of such effects in video signal mixing efforts of the prior art.

The foregoing and numerous other objects, advantages, and inherent functions of the present invention will become apparent as the same is more fully understood from the following description, which describes the invention; it is to be understood, however, that the various embodiments are not intended to be exhausting nor limiting of the invention but are given for purposes of illustration in order that others skilled in the art may fully understand the invention and principles thereof and the manner of applying it in practical use so that they may modify it in various forms, each as may be best suited to the conditions of the particular use.

DESCRIPTION OF DRAWINGS

In the drawings:

FIG. 2 is another block diagram to particularly detail the shadow processing portion of the FIG. 1 embodiment;

FIG. 3, including FIGS. 3A-C, is a pictorial diagram of a typical scene to be mixed to particularly point out the special effects provided by the invention.

DESCRIPTION OF INVENTION

Figure 1:
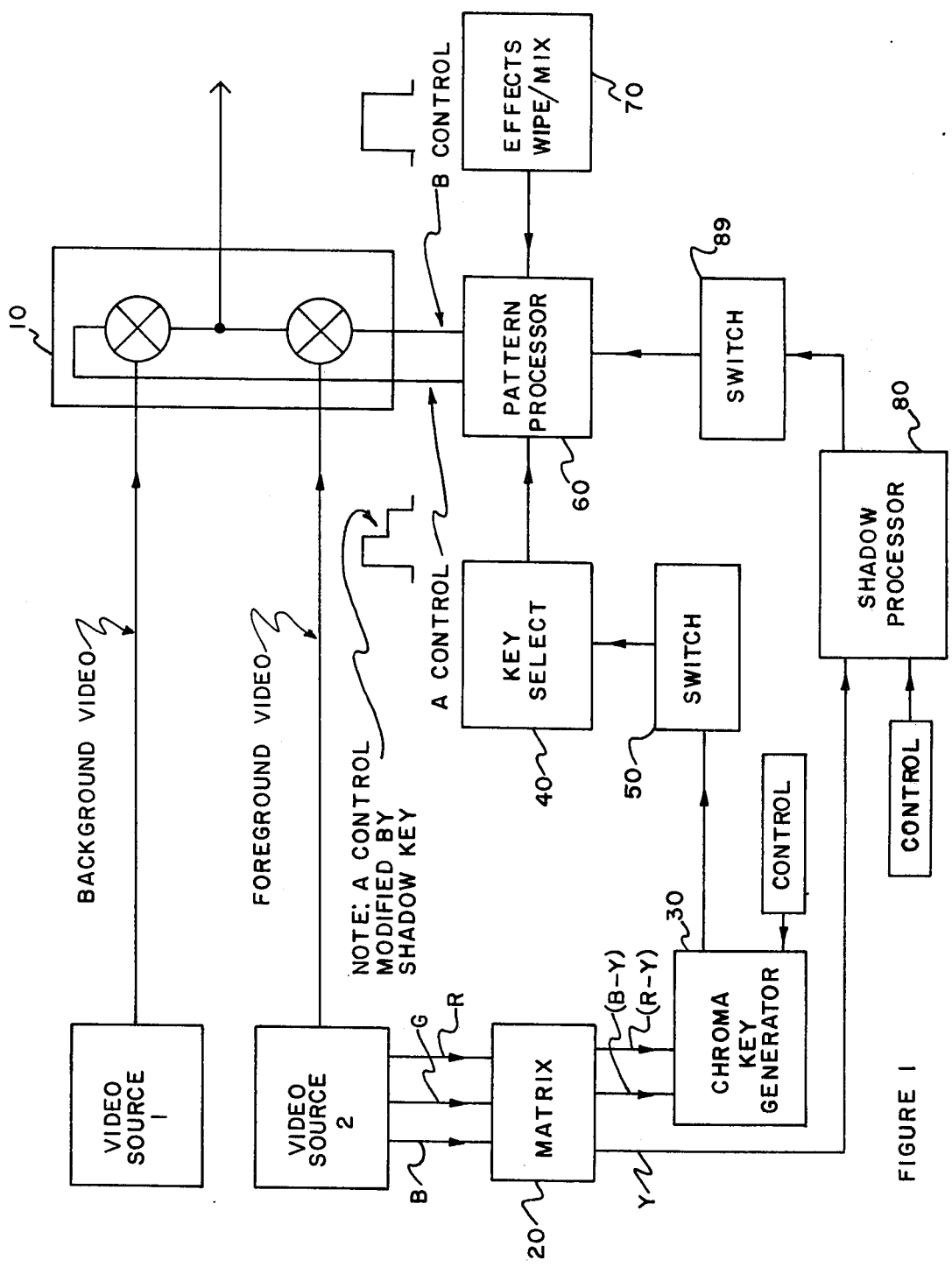
FIG. 1 is a block diagram of the video signal mixing system in accordance with the present invention.

FIG. 1 illustrates in the simplest block form, the video signal mixing system of the present invention to provide a novel video effects; viz., the three-dimensional shadow effects. Video signals representative, say, of a background picture being televised originate from a suitable source shown only in block form and designated video source 1; video signals representative, say, of a foreground picture being televised originate from a suitable source shown only in block form and designated video source 2. The video signals originating from video source 1 are composite video signals and are coupled to a means 10 such as a conventional mixer for combining separate input signals linearly in the desired proportion to produce an output signal. The video signals originating from video source 2 define a plurality of signals; composite video coupled to means 10 and the primary color signals R, G, and B of the foreground picture. Each of the primary color signals are coupled to a means 20 such as a conventional RGB resistive matrix wherein the RGB signals takes the form of color difference signals $R-Y$, $B-Y$ and a luminance signal Y because of the transformation process of the matrix. As color difference signals $R-Y$, $B-Y$ and luminance signal Y are well known to those skilled in the art, no further explanation thereof is deemed necessary. It should also be noted that the primary color signals R, G, and B, are the same signals required to produce the foreground composite video signal less all blanking and synchronizing signals necessary to form the composite picture signal.

Color difference signals $R-Y$, $B-Y$ are next coupled to a means 30 which is, for example, a chroma key generator for generating a chroma key signal and may have externally operable control means for selecting a color represented by the chroma key and controlling the gain thereof. This generator is well known to those skilled in the art for providing a signal to alternate the input selection of the switching system in accordance with a selected color and is generally operated by a key select means 40 receiving the chroma key signal via a switch means 50. The selected chroma key signal is next coupled to a means 60 such as a pattern processor for processing the chroma key signal and other conventional effects applied thereto via the means 70. Outputs, A Control and B Control, of the processor means 60 generated therein in accordance with normal practices, are coupled to the means 10 to control the combining of the background and foreground video generated by video sources 1 and 2 to provide an output signal hereinafter referred to as the program video signal, which, can be observed directly or re-entered for further processing by other systems.

The above described system departs from existing systems as hereinafter described to provide the novel video effects. Coupled to receive the luminance signal Y from means 20 is a means 80 defining a shadow processor. The processor is shown in more detail in FIG. 2, and is seen to comprise a means whereby the luminance signal is treated for application to and from a delay means 87 by amplifiers 82, 83. The delayed signal is then DC restored by a clamp 85 and again treated to select a range of amplitudes by another amplifier 84 which adjusts the direct current level of the desired portion so that it falls between points selected by another means 86 such as a clipper or limiter and is applied in amplitude adjusted form by amplifier 88 as a shadow key signal for application to pattern processor 60 via the switch 89.

Although not shown in FIG. 1, switches 50 and 89 are caused to track together in a conventional manner so that a matching chroma key signal and a shadow key signal are always provided to the effects system. The effect of adding the shadow key signal to the means 60 is to proportionally reduce the amplitude of the A Control signal being fed to means 10 and thus reduce the level of the background composite video causing the shadow effect to appear on the program video signal.

As an example to illustrate the invention, reference should be made to FIG. 3. In FIG. 3A there is shown the normal shadow 100 cast when an object 102 is placed in front of and close to a background surface 104 due to front lighting from, say, conventional light sources, not shown. For the purpose of explanation, assume that background surface 104 is the color blue. Shown in FIG. 3B is a background 106 having a scene thereon, such as for example, a painting of distant mountains 108. In accordance with the principle and other ancillary objects of the subject invention, object 102 and normal shadow 100 of the object is to be provided via the system of the present invention to appear as being placed on the background scence as shown in FIG. 3C as the program video signal. Thus, video source 1 would originate a composite video signal for the background scene of FIG. 3B and video source 2 would originate a composite video signal for the foreground scene of FIG. 3A. Accordingly, a chroma key signal will be produced in accordance with the color of the background surface 104, which, is normally blue. Simultaneously, shadow processor 80 detects the luminance variations in the existing background to produce a shadow key signal which is tracked along with the generated color key and applied to the means 60. Means 60 in turn, and as already discussed, produces the A and B control signals modified by the shadow key signal to cause the shadow effect to appear on the program output video.

The modified A Control signal just described is modified to reduce the video gain and is modified by linearly adding in a conventional manner the shadow key signal to the A Control signal in accordance with the variations in light intensity i.e., the control signal is modulated by the shadow information. Modifying the A Control signal is in effect adding an additional mixer into the system in that the effect upon the composite video is that of multiplying the control signal and the video.

Figure 4:
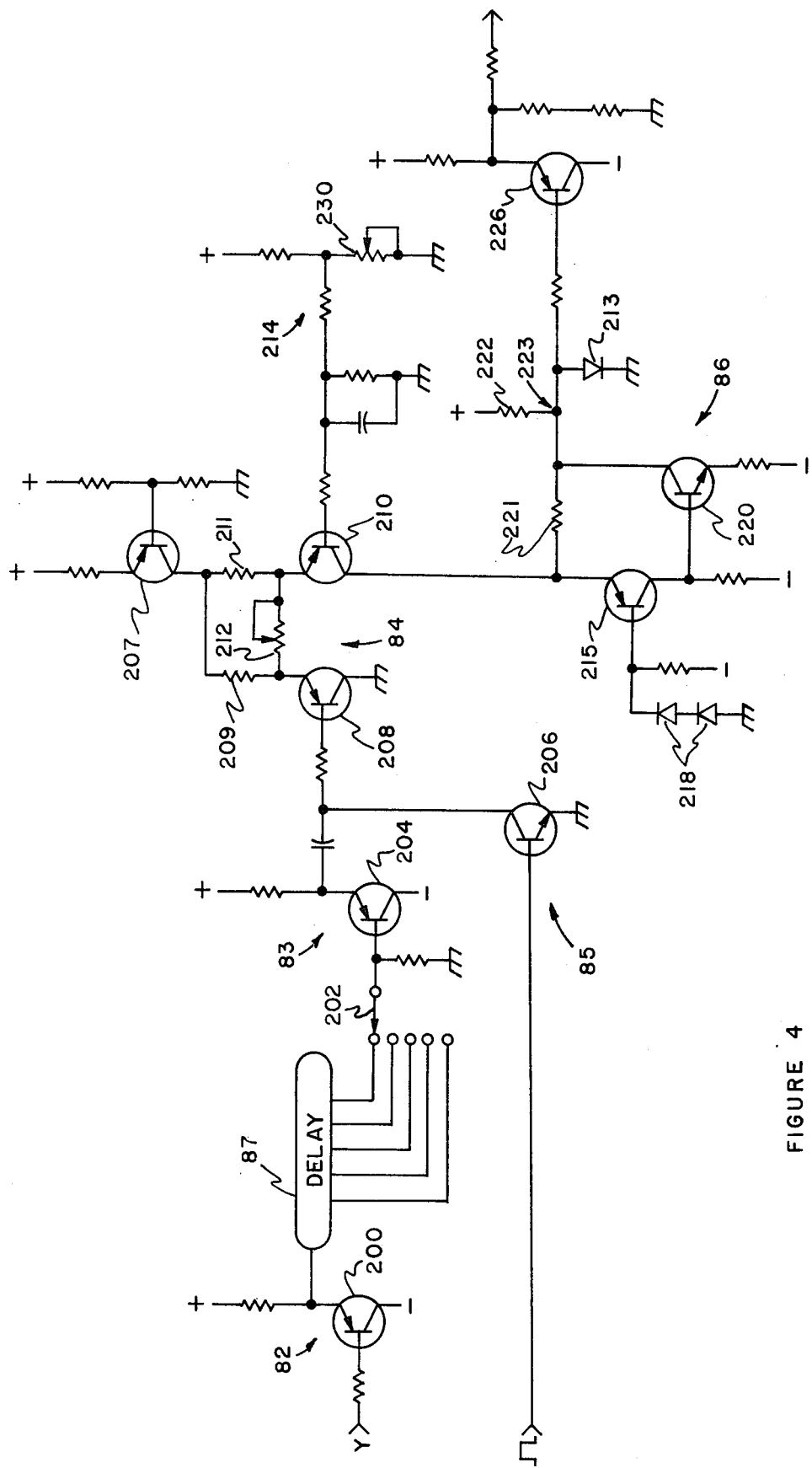
FIG. 4 is a schematic diagram of the shadow processing portion of the FIG. 2 embodiment.

Referring now to FIG. 4 there is shown the schematic diagram of the shadow processing means according to the present invention. The luminance signal Y is coupled via an emitter follower amplifier 82 comprising the transistor 200 operatively disposed between suitable sources of reference potential, say positive and negative 11 volts. The amplifier couples the luminance signal to, and provides isolation for, the delay line 87 for delaying the luminance signal, which is necessary because once the two color difference signals $R-Y$, $B-Y$ are derived, they are delayed which requires that the luminance be delayed so that shadow registration with the chroma key is possible. In the preferred embodiment, delay line 87, not shown in detail because of its being well known to those skilled in the art, is preferably a discrete delay line having means for selectively providing a delay of between, say, about 0 up to 1200 nanoseconds to match the delay of the color encoders. (The switch 202 is shown only to indicate that various delays may be selected.) The delayed luminance signal is then coupled to another emitter follower amplifier 83 comprising the transistor 204 operatively connected between the already mentioned reference voltage sources. This latter amplifier and associated conventional components provides termination for delay line 87 and isolation from the following stages.

The delayed luminance signal is then DC restored to the blanking level by a DC restorer or clamping stage 85 commonly comprising a grounded emitter transistor 206 which is turned on and off during specific intervals by conventional sync pulses to effectively ground the signal during sync time; the sync time occurs during blanking time. As the generation of clamping pulses are well known, no further discussion is believed necessary.

The DC restored luminance signal is then coupled to be amplified by an emitter—coupled differential amplifier 84 comprising the transistor 208, 210 supplied with a constant current from a current source such as the transistor 207. A gain control, such as variable resistor 212 connected between the emitters of transistor 208, 210 and two equal value resistors 209, 211 are provided as well as a variable voltage circuit means generally indicated as 214 connected to the base of transistor 210. As is well known, the variable voltage circuit provides an adjustable means so that the operating points of transistors 208, 210 can be matched whereas, resistors 209, 211 increase the region of linearity around the operating point.

The output of the differential amplifier 84 is coupled to an inverting amplifier generally indicated as limiter 86, the output of which is limited in the positive direction by the diode 213 and limited in the negative direction as hereinafter described. A common base amplifier comprising the transistor 215 is connected to a common emitter amplifier comprising the transistor 220 to form a feedback pair rendered independent of temperature because of the diode pair 218 in the base circuit thereof. Transistor 220 is coupled to be responsive to the collector voltage of transistor 215, which, changes in accordance to the conduction of current through transistor 210. The collector of transistor 220 is coupled back to the input of the feedback pair via a resistor 221, to the diode 213 and to a source of potential via the resistor 222. In operation, conduction of transistor 220 takes signal current away from transistor 215 via the resistor 221 to pull the voltage at the terminal 223 negative until no further signal current is available via transistor 210. As a result, the signal is negatively limited.

The signal voltage at the junction 223 is applied to an emitter follower amplifier 88 comprising the transistor 226 operatively connected between the sources of potential and is available at the output as the shadow key signal. In the preferred embodiment, the shadow key signal is a 1 volt-peak to peak signal and is operatively varied by the control 230 to be within a window as set by the base circuit of transistor 210. The control 230 controls the shadow density and is provided to be varied as desired by an operator.

While there has been shown and described the preferred embodiment of the present invention, it will be apparent to those skilled in the art that many changes and modifications may be made without departing from the invention in its broader aspects. For example, a plurality of video signal sources may be selectively applied to the mixer and shadow processor through proper switching arrangements to enable a plurality of different signals to be combined as desired. Therefore, the appended claims are intended to cover all such modifications and changes that fall within the true spirit and scope of the invention.

The invention is claimed in accordance with the following:

1. An apparatus for switching a plurality of video signals so as to produce a composite video signal that produces a composite image containing portions of the incoming video signals including intensities to provide shadows, the apparatus comprising:
   video source means for generating a plurality of incoming video signals, said signals defining a plurality of color signals forming at least first and second color video signals representing first and second information;
   matrix means coupled with said video source means for forming color difference signals and a luminance signal representing a portion of information of one of said color video signals;
   color selector means responsive to said color difference signals for developing a first key signal representing a selectable color of said portion of information of said one of said color video signals;
   luminance selector means responsive to said luminance signal for developing a second key signal representing variable intensities of said portion of information of said one of said color video signals;
   processor means responsive to both said first and second key signals for developing control signals, at least one of which is modulated in accordance with the variable intensities of said portion of information of said one of said color video signals; and
   combining means into which said plurality of incoming video signals and said control signals are fed for providing thereoutof the composite video signal.

2. The apparatus according to claim 1 including first and second tracking switches for tracking said first and said second key signals together so that matching key signals are processed by said processor means.

3. The apparatus according to claim 1 wherein said color selector means defines a chroma key generator including externally operable control means for selecting the color of said portion of information of said one of said color video signals.

4. The apparatus according to claim 1 wherein said luminance selector means defines a shadow key generator, comprising:
   first means responsive to said luminance signal for providing a treated luminance signal, said first means including a selectable delay network and a DC restorer for treating said luminance signal;
   second means responsive to said treated luminance signal for additionally treating said luminance signal, said second means including an amplifier means having external operable control means for varying the intensities of said luminance signal and a limiter means for additionally treating said luminance signal; and
   third means responsive to said additionally treated luminance signal for providing said second key signal.

5. The apparatus according to claim 5 wherein said selectable delay network provides for a delay of about 0 to 1200 nanoseconds.

6. The apparatus according to claim 1 wherein said combining means includes first mixing means for controlling the other of said color video signals in proportion to said one of said modulated control signals, second mixing means for controlling said one of said color video signals in portion to the other modulated control signals, and third mixing means combining products of said first and second mixing means for forming said composite video signal.

7. The apparatus according to claim 1 further comprising effects means operatively coupled to said processor means for providing effects for the composite video signal.

8. The method of switching a plurality of video signals so as to produce a composite video signal that produces a composite image containing portions of the incoming video signals including intensities to provide shadows, the method comprising the steps of:
   generating a plurality of incoming video signals, said signals defining a plurality of color signals forming at least first and second color video signals representing first and second information;
   forming from one of said plurality of incoming video signals color difference signals and a luminance signal representing a portion of information of one of said color video signals;
   developing a first key signal from said color difference signals representing a selectable color of said portion of information of said one of said color video signals;
   developing a second key signal from said luminance signal representing variable intensities of said portion of information of said one of said color video signals;
   developing first and second control signals from both said first and second key signals, at least one of which is modulated in accordance with the variable intensities of said portion of information of said one of said color video signals; and
   combining said plurality of incoming video signals and said control signals for providing the composite video signal.

9. The method according to claim 8 further including the step of providing first and second tracking switches for tracking said first and said second key signals together so that matching key signals are processed by said processor means.

10. The method according to claim 8 wherein the step of providing luminance selector means further includes the steps of
   providing first means responsive to said luminance signal for providing a treated luminance signal, said first means including a selectable delay network and a DC restorer for treating said luminance signal;
   providing second means responsive to said treated luminance signal for additionally treating said luminance signal, said second means including an amplifier means having external operable control means for varying the intensities of said luminance signal and a limiter means for additionally treating said luminance signal; and
   providing third means responsive to said additionally treated luminance signal for providing said second key signal.

11. A composite color television system wherein separate background and foreground scenes derived from a background color video source and a foreground color video source are provided to be combined so as to produce a composite video signal that produces a composite image containing portions of the background and foreground scenes including intensities to produce shadows, the apparatus comprising:
   a first processing channel for processing color difference signals representing the foreground scene derived from the foreground color video source;
   a second processing channel for processing luminance signals representing the foreground scene derived from the foreground color video source;
   a third processing channel for combining the processed color difference signals and the processed luminance signals to form control signals; and
   mixing means, coupled to receive inputs from both the background and foreground color video sources, under the control of said control signals for combining said inputs in such a manner as to produce the composite video signal.

* * * * *

UNITED STATES PATENT AND TRADEMARK OFFICE
CERTIFICATE OF CORRECTION

PATENT NO. : 4,041,527

DATED : August 9, 1977

INVENTOR(S) : BRUCE LELAND RAYNER, et al

It is certified that error appears in the above-identified patent and that said Letters Patent are hereby corrected as shown below:

Column 4, Line 20 "scence" should be --scene--.
Column 6, Line 57 "claim 5" should be --claim 4--.
Column 6, Line 65 "portion" should be --proportion--.

Signed and Sealed this

Ninth Day of May 1978

[SEAL]

Attest:

RUTH C. MASON
Attesting Officer

LUTRELLE F. PARKER
Acting Commissioner of Patents and Trademarks